US009620252B2

(12) United States Patent
Graham

(10) Patent No.: US 9,620,252 B2
(45) Date of Patent: Apr. 11, 2017

(54) ISLAND MODE FOR NUCLEAR POWER PLANT

(71) Applicant: Babcock & Wilcox mPower, Inc., Charlotte, NC (US)

(72) Inventor: Thomas G Graham, Lynchburg, VA (US)

(73) Assignee: BWXT mPower, Inc., Charlotte, NC (US)

(*) Notice: Subject to any disclaimer, the term of this patent is extended or adjusted under 35 U.S.C. 154(b) by 758 days.

(21) Appl. No.: 13/861,085

(22) Filed: Apr. 11, 2013

(65) Prior Publication Data

US 2013/0272471 A1    Oct. 17, 2013

Related U.S. Application Data

(60) Provisional application No. 61/625,325, filed on Apr. 17, 2012.

(51) Int. Cl.
*G21C 9/00* (2006.01)
*G21D 1/02* (2006.01)
*G21D 3/04* (2006.01)

(52) U.S. Cl.
CPC ............... *G21C 9/00* (2013.01); *G21D 1/02* (2013.01); *G21D 3/04* (2013.01); *Y02E 30/40* (2013.01)

(58) Field of Classification Search
CPC ............... G21C 1/36; G21C 7/32; G21C 7/36
USPC .............................. 376/71, 207, 210–11, 277
See application file for complete search history.

(56) References Cited

U.S. PATENT DOCUMENTS

| 3,932,213 | A | * | 1/1976 | Musick | ............ G21D 3/04 |
| | | | | | 376/210 |
| 4,022,655 | A | * | 5/1977 | Gaouditz | ............ G21C 9/012 |
| | | | | | 261/121.1 |
| 4,505,873 | A | * | 3/1985 | Petetrot | ............ G21D 3/12 |
| | | | | | 376/211 |
| 4,897,240 | A | | 1/1990 | Sako | |
| | | | | (Continued) | |

OTHER PUBLICATIONS

International Search Report and Written Opinion dated Jul. 30, 2013 for PCT/US2013/036283.

*Primary Examiner* — Jack W Keith
*Assistant Examiner* — Lily C Garner
(74) *Attorney, Agent, or Firm* — Nelson Mullins Riley & Scarborough LLP

(57) ABSTRACT

A nuclear power plant comprises a pressurized water reactor (PWR) and a steam generator driving a turbine driving an electric generator. A condenser condenses steam after flowing through the turbine. Responsive to a station blackout, the nuclear power plant is electrically isolated and a bypass valve is opened to convey bypass steam flow from the steam generator to the condenser without flowing through the turbine. The thermal power output of the PWR is gradually reduced over the transition time interval. After opening, the bypass valve is gradually closed over the transition time interval. A supplemental bypass valve may also be opened responsive to the station blackout to convey supplemental bypass steam flow from the steam generator to a feedwater system supplying secondary coolant feedwater to the steam generator. The supplemental bypass steam flow does not flow through the turbine and does not flow through the condenser.

14 Claims, 6 Drawing Sheets

(56) References Cited

U.S. PATENT DOCUMENTS

| | | | |
|---|---|---|---|
| 4,912,732 A * | 3/1990 | Singh | F22B 35/004 |
| | | | 376/211 |
| 5,000,907 A | 3/1991 | Chevereau et al. | |
| 5,011,652 A | 4/1991 | Tominaga et al. | |
| 5,045,274 A | 9/1991 | Donaldson | |
| 5,075,070 A | 12/1991 | Costes | |
| 5,087,408 A | 2/1992 | Tominaga et al. | |
| 5,102,616 A | 4/1992 | Gardner et al. | |
| 5,268,939 A * | 12/1993 | Tang | F01K 3/181 |
| | | | 376/210 |
| 5,301,216 A | 4/1994 | Klapdor et al. | |
| 5,517,538 A | 5/1996 | Seidelberger et al. | |
| 6,198,786 B1 | 3/2001 | Carroll et al. | |
| 6,249,561 B1 * | 6/2001 | Aburomia | G21C 15/18 |
| | | | 376/283 |
| 6,795,518 B1 | 9/2004 | Conway et al. | |
| 7,521,825 B2 | 4/2009 | Lasseter et al. | |
| 2007/0129110 A1 | 6/2007 | Lasseter et al. | |
| 2010/0316181 A1 * | 12/2010 | Thome | F22B 1/023 |
| | | | 376/372 |
| 2011/0106321 A1 | 5/2011 | Cherian et al. | |
| 2011/0283701 A1 * | 11/2011 | Eftekharzadeh | G21D 1/02 |
| | | | 60/644.1 |
| 2012/0029720 A1 | 2/2012 | Cherian et al. | |
| 2012/0029897 A1 | 2/2012 | Cherian et al. | |
| 2012/0223531 A1 | 9/2012 | Brooks et al. | |

* cited by examiner

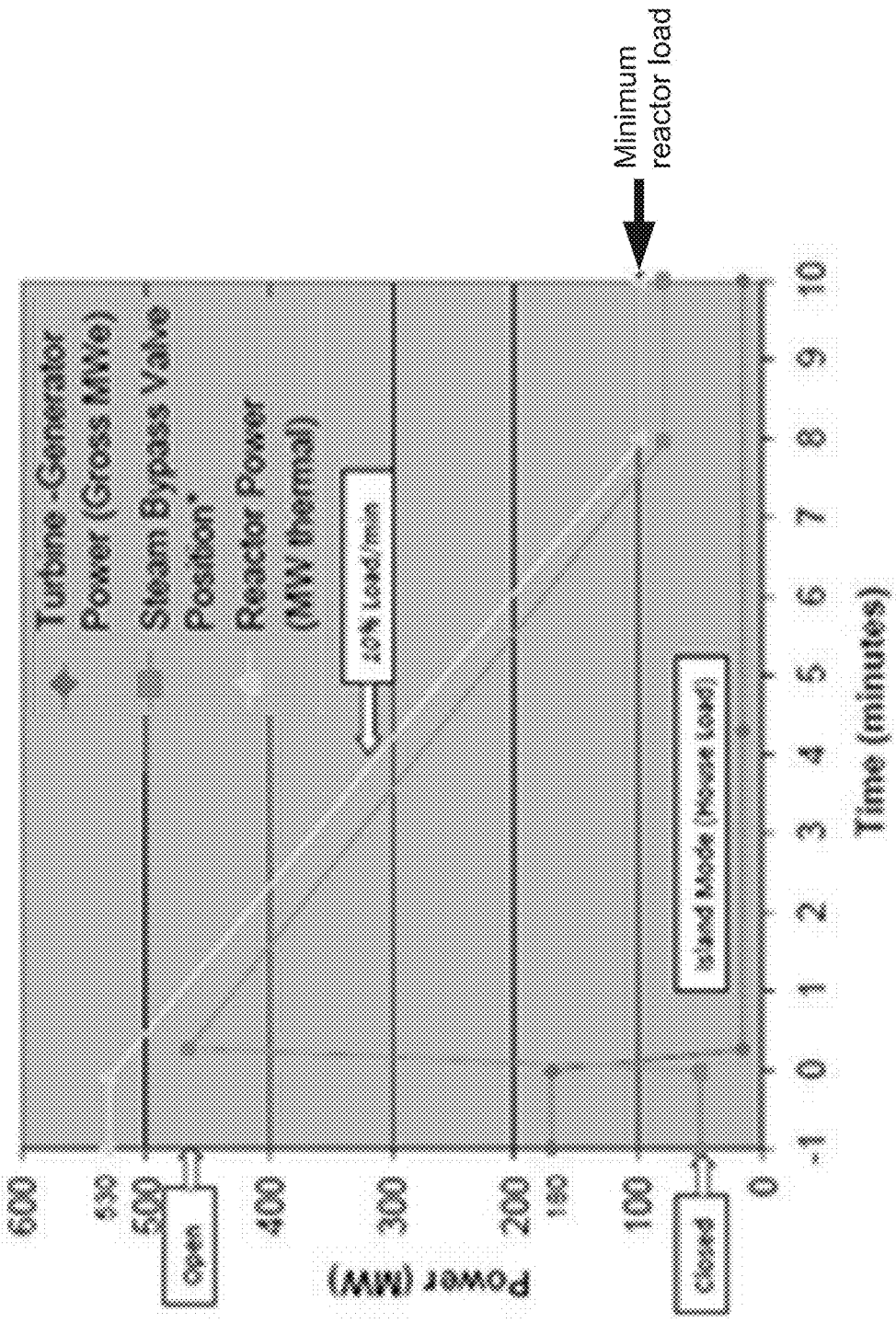

ISLAND MODE FOR NUCLEAR POWER PLANT

This application claims the benefit of U.S. Provisional Application No. 61/625,325, filed Apr. 17, 2012. U.S. Provisional Application No. 61/625,325, filed Apr. 17, 2012, is hereby incorporated by reference in its entirety into the specification of this application.

BACKGROUND

The following relates to the nuclear reactor arts, nuclear power generation arts, nuclear reactor safety arts, and related arts.

Electrical power grids comprise an interconnected network (i.e., "grid") of power generation components, power transmission components, power conditioning components, and power consuming components (i.e., "loads"). Ordinarily, operation of the components is interdependent so that, for example, a power generation plant is designed to operate supplying power to a switchyard delivering power to a (cumulative) load that has known characteristics with statistically predicable narrow fluctuations.

These interconnections can be lost due to various failures. In particular, a "blackout" occurs when power supplied to the electrical power grid is abruptly interrupted. In such cases, it is known to operate a power generation plant in so-called "island mode" or "island mode of operation" where the plant is designed to accommodate the blackout condition.

In the case of a nuclear power plant, station blackout introduces radiological safety considerations. In some approaches, no island mode operation is attempted; rather, upon loss of switchyard power the reactor trips, control rods scram to shut down the nuclear chain reaction, and decay heat removal systems are brought online. Diesel generators and/or batteries are relied upon to supply power for the safety systems. This approach ensures safety, but subsequently requires a lengthy reactor restart process. Typically, power generation capacity is lost for days or longer. Moreover, the abrupt shutdown can stress the turbine and other components.

The Economic Simplified Boiling-Water Reactor (ESBWR) of GE-Hitachi (see http://www.nrc.gov/reactors/new-reactors/design-cert/esbwr/overview.html, last accessed Oct. 17, 2012) is designed to address station blackout by entering an island mode in which the switchyard breaker opens, a bypass valve dumps up to 110% of full steam load into the condenser, the BWR power output is reduced to about 40-60% over several minutes, and the (reduced) house electrical loads continue to be supplied by the turbine driven by the BWR. See "Advisory Committee on Reactor Safeguards ESBWR Design Certification Subcommittee", Nuclear Regulatory Commission Official Transcript of Proceedings, Oct. 3, 2007 (Work Order No. NRC-1799). In other systems the bypass capacity is lower, e.g. 30% of full steam load. Id.

These approaches advantageously avoid reactor scram and subsequent reactor restart, but have certain other disadvantages. During the initial steam bypass into the condenser, the turbine loses steam and undergoes a transient, which can stress the turbine. The steam dump into the condenser also stresses the condenser. In the case of a BWR, there is substantial condenser capacity to accommodate the steam bypass, but a pressurized water reactor (PWR) typically has relatively less condenser capacity. It has been suggested that the ability in the case of a PWR to dump steam to atmosphere might be utilized (Id.), but venting to atmosphere raises other regulatory issues or overpressure alarms that would likely delay the operational restart of the PWR-based nuclear power plant with the power grid.

Disclosed herein are improvements that provide various benefits that will become apparent to the skilled artisan upon reading the following.

BRIEF SUMMARY

In accordance with one aspect, a nuclear power plant comprises: a nuclear reactor comprising a pressurized water reactor (PWR) and a steam generator configured to transfer heat from primary coolant water heated by the PWR to secondary coolant water in order to convert the secondary coolant water to steam; a turbine connected with the steam generator to be driven by steam output by the steam generator; an electric generator connected with the turbine to be driven by the turbine to generate electricity; an electrical switchyard receiving electrical power from the electrical power generator during normal operation of the nuclear power plant; a condenser connected with the turbine to condense steam exiting the turbine; and a turbine bypass system. The turbine bypass system is configured to transfer a quantity of steam output by the steam generator to the condenser without passing through the turbine responsive to loss of offsite electrical power to the nuclear power plant wherein the quantity of steam transferred to the condenser without passing through the turbine is effective to (1) allow the nuclear reactor to power down without triggering steam generator or nuclear reactor pressurizer safety valve setpoints and (2) continue powering house electrical loads of the nuclear power plant using the turbine.

In accordance with another aspect, a method is disclosed of operating a nuclear power plant that includes a pressurized water reactor (PWR), a steam generator, a turbine, an electric generator, and a condenser. The disclosed method comprises: operating the PWR to heat primary coolant flowing through a nuclear reactor core comprising fissile material immersed in the primary coolant water; operating the steam generator to convert secondary coolant feedwater to steam using primary coolant water heated by the operating PWR; operating the turbine by flowing steam from the steam generator through the turbine and then through the condenser; driving the electric generator using the turbine to generate electricity; conveying the generated electricity to an electrical switchyard; and responsive to a station blackout, transitioning the nuclear power plant to an island mode over a transition time interval. The transitioning includes performing transition operations including: at the beginning of the transition time interval, disconnecting the electric generator from the electrical switchyard and opening a bypass valve to convey bypass steam flow from the steam generator to the condenser wherein the bypass steam flow does not flow through the turbine; after opening the bypass valve, gradually closing the bypass valve over the transition time interval; and gradually reducing the thermal power output of the PWR over the transition time interval.

In accordance with another aspect, a method is disclosed that operates in conjunction with a nuclear power plant comprising a pressurized water reactor (PWR) operating to heat primary coolant water, a steam generator using the heated primary coolant water to convert secondary coolant feedwater to steam, a turbine driven by steam from the steam generator and operatively connected with an electric generator, and a condenser connected with the turbine to condense steam after flowing through the turbine. The disclosed method comprises transitioning the nuclear power plant to an island mode over a transition time interval by transition operations including: responsive to detecting a station blackout, electrically isolating the nuclear power plant and opening a bypass valve to convey bypass steam flow from the steam generator to the condenser without flowing through the turbine; and gradually reducing the thermal power output of the PWR over the transition time interval. The transition operations do not include venting steam from the steam generator to atmosphere. In some embodiments, after opening the bypass valve, the bypass valve is gradually closed over the transition time interval. In some embodiments, a supplemental bypass valve is also opened responsive to detecting the station blackout, which conveys supplemental bypass steam flow from the steam generator to a feedwater system supplying secondary coolant feedwater to the steam generator, wherein the supplemental bypass steam flow does not flow through the turbine and does not flow through the condenser.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIG. 6 diagrammatically shows the transition to island mode by way of plotting predicted turbine-generator power, reactor thermal power output, and bypass switch position over an illustrative 8 minute transition interval.

DETAILED DESCRIPTION OF THE PREFERRED EMBODIMENTS

Disclosed herein are island mode operation techniques suitable for use in a pressurized water reactor (PWR). The disclosed approaches avoid venting secondary coolant steam to atmosphere, instead employing steam bypass to the condenser. Overloading of the available PWR condenser capacity is avoided by gradually closing the bypass valve over the course of the transition to island mode in order to limit the time-integrated bypass stream flow to an amount sufficient to avoid tripping steam generator or pressurizer safety valve setpoints. Additionally, in some embodiments a portion of the bypass steam flow is sent to the feedwater system rather than to the condenser, effect using the feedwater as a supplemental condenser. These aspects also reduce the stress of the transient on the turbine. In some embodiments the final reduced reactor power level is 20% or less of full capacity—at this low reactor power level, the steam bypass flow can be stopped entirely, and the plant can run indefinitely on its own power in this steady state in island mode.

On the other hand, if ancillary events ultimately trip the reactor, it is already at a low power level which facilitates safe reactor shutdown.

Figure 1:
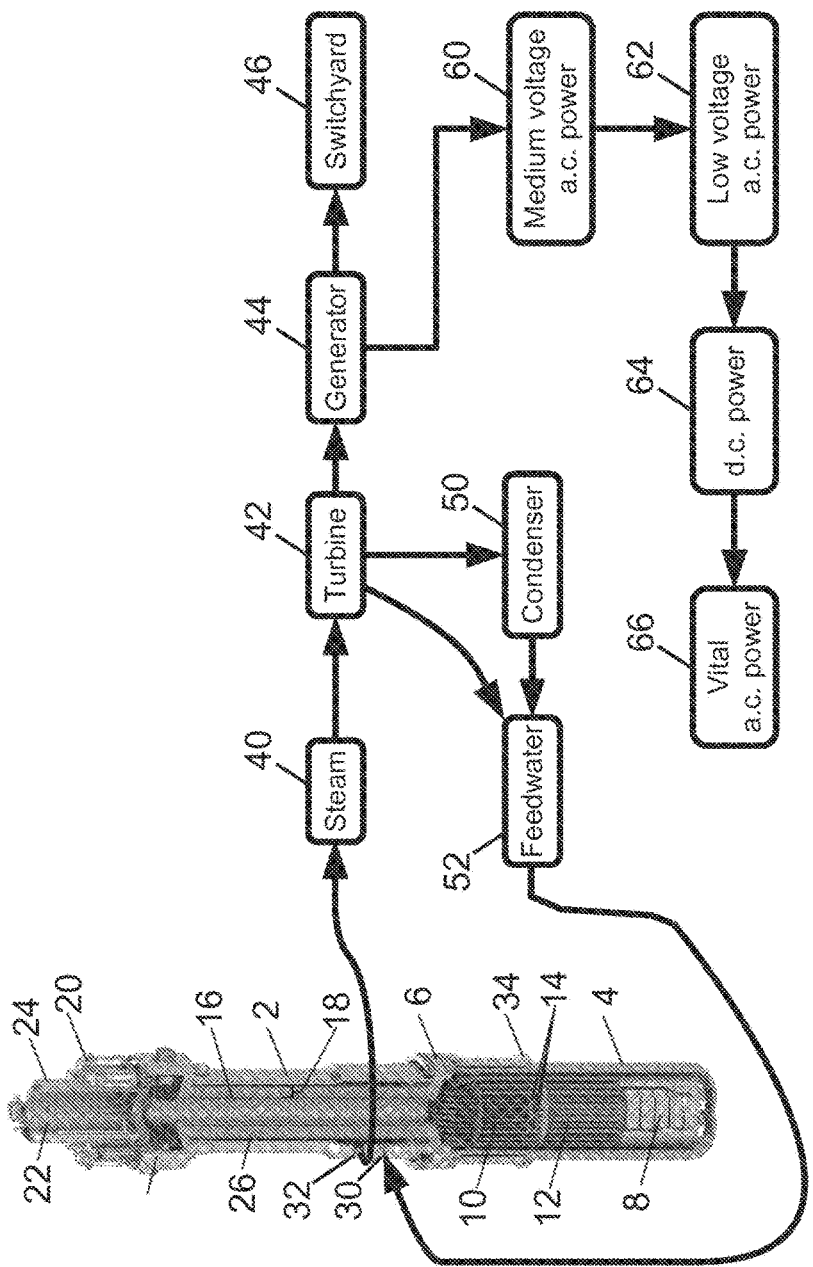
FIG. 1 diagrammatically shows a nuclear power plant in its normal operating mode.

FIG. 1 illustrates an illustrative nuclear reactor of the pressurized water reactor (PWR) type, which includes a pressure vessel comprising an upper vessel 2 and a lower vessel 4 joined by a mid-flange 6. The reactor pressure vessel houses a nuclear reactor core 8 comprising fissile material, e.g. $^{235}U$ immersed in primary coolant water. Reactivity control is provided by a control rods system that includes control rod drive mechanisms (CRDMs) 10 and control rod guide frame supports 12. The illustrative CRDMs 10 are internal CRDMs disposed inside the pressure vessel and including CRDM motors 14 disposed inside the pressure vessel; however, external CRDMs with motors mounted above the pressure vessel and connected via tubular pressure boundary extensions are also contemplated. The pressure vessel of the operating PWR contains circulating primary coolant water that flows upward through the nuclear reactor core 8 and through a cylindrical central riser 16, discharges at the top of the central riser 16 and flows back downward through a downcomer annulus 18 defined between the pressure vessel and the central riser to complete the primary coolant circuit. In the illustrative PWR, primary coolant circulation is driven by reactor coolant pumps (RCPs) 20 which may be located where illustrated in FIG. 1 or elsewhere; moreover, natural circulation or the use of internal RCPs disposed inside the pressure vessel is also contemplated. Pressure inside the pressure vessel of the illustrative PWR is maintained by heating or cooling a steam bubble disposed in an integral pressurizer volume 22 of an integral pressurizer 24; alternatively, an external pressurizer can be connected with the pressure vessel by piping. The illustrative PWR is an integral PWR in which a steam generator (or plurality of steam generators) 26 is disposed inside the pressure vessel, and specifically in the downcomer annulus 18 in the illustrative PWR; alternatively, an external steam generator can be employed. In the illustrative integral PWR, secondary coolant in the form of feedwater is input to the steam generator 26 via a feedwater inlet 30, and secondary coolant in the form of generated steam exits via a steam outlet 32. In the alternative case of an external steam generator, the ports 30, 32 would be replaced by primary coolant inlet and outlet ports feeding the external steam generator. The illustrative integral PWR also includes a support skirt 34.

With continuing reference to FIG. 1, the state of the balance-of-plant (BOP) in the steady state, i.e. during normal operation, is diagrammatically shown. The steam outlet 32 of the nuclear reactor delivers steam to a steam system 40 that drives a turbine 42 that turns an electric generator 44 so as to generate electricity that is delivered to an electrical switchyard 46 that feeds an electrical grid (not shown). Steam flows from the turbine 42 into a condenser 50 that condenses the steam to generate feedwater that is delivered by a feedwater system 52 to the feedwater inlet 30 of the steam generator 26 of the integral PWR so as to complete the steam cycle. Condensate generated inside the turbine 42 is also recaptured and added to the feedwater, as indicated by an arrow running from the turbine 42 to the feedwater system 52.

In addition to feeding the switchyard 46, the generator 44 also delivers house electricity for running pumps, monitors, and other components of the nuclear reactor plant. In the diagrammatically illustrated BOP, the generator 44 feeds a medium voltage a.c. power system 60 which in turn powers a low voltage a.c. power system 62, which in turn powers a d.c. power system 64 that drives a vital a.c. power system 66. This arrangement advantageously allows for both d.c. and a.c. power for driving components of the nuclear reactor plant. Driving the vital a.c. power system 66 using the d.c. power system 64 enables convenient switchover to battery or diesel generator power (not shown) in the event that the usual power systems 60, 62, 64 fail. However, other electrical layouts are also contemplated, and the power systems 60, 62, 64, 66 shown in FIG. 1 are to be understood to be merely an illustrative example.

Figure 2:
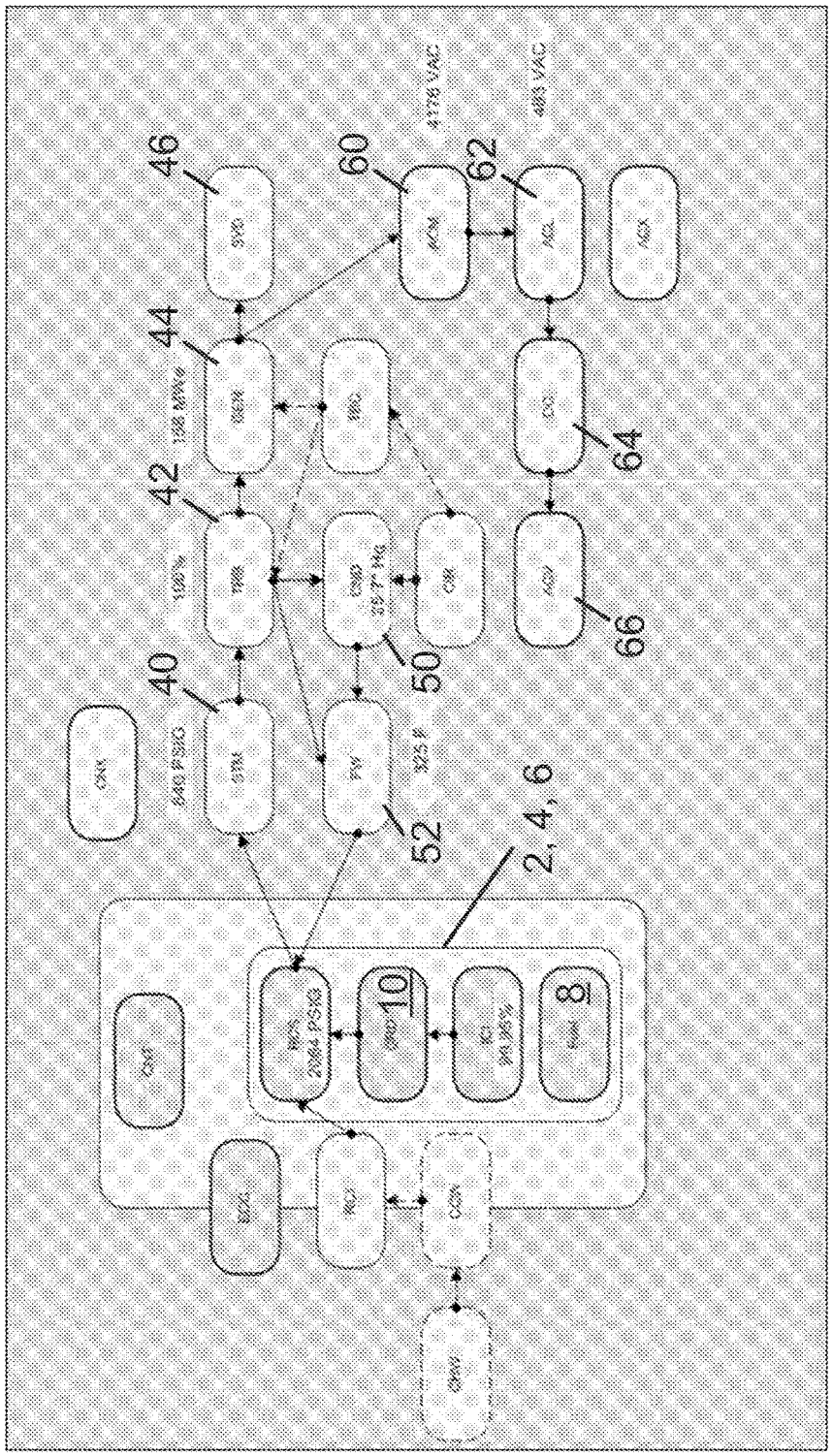
FIG. 2 diagrammatically shows the nuclear power plant of FIG. 1 in its normal operating mode, shown in an alternative diagrammatic representation.

With reference to FIG. 2, the normal operating state of the reactor is shown in an alternative diagrammatic representation that further includes additional components to provide further context, and also labels certain nominal operating settings for an illustrative small modular reactor (SMR) of the integral PWR type. In FIG. 2 (as well as in FIG. 4 to be described later), the following notation is used: "Fuel" denotes the nuclear reactor core; "CNX"=auxiliary condenser system; "CHW"=chilled water; "CNT"=containment; "ICI"=nuclear instrumentation; "RCS"=reactor coolant system; "ECC"=emergency core cooling system; "RCI"=reactor coolant inventory and purification system; "CRD"=control rod drives; "CCW"=component cooling water system; "FW"=feedwater; "STM"=steam; "CND"=condenser; "TRB"=turbine; "GEN"=generator; "SYD"=switchyard; "TBC"=turbine cooling building; "CIR"=circulating water; "ACM"=medium voltage alternating current power; "ACV"=vital alternating current power; "DC"=direct current power; "ACL"=low voltage alternating current power; and "ACX"=auxiliary alternating current power. As labeled in FIG. 2, the nominal operating settings for the illustrative SMR include: primary coolant pressure inside the pressure vessel 2, 4, 6 of 2064 PSIG; steam system 40 operating at a pressure of 840 PSIG; turbine 42 operating at 100% capacity; electrical generator 44 outputing 158 MWe (megawatts electrical); the condenser 50 operating at a pressure of 25.7" Hg (inches mercury); and the feedwater system 52 delivering feedwater to the steam generator inlet 30 at 325° F. As further labeled in FIG. 2, nominal balance-of-plant (BOP) operational settings include the medium voltage a.c. power system 60 operating at 4176 VAC and the low voltage a.c. power system 62 operating at 483 VAC.

Figure 3:
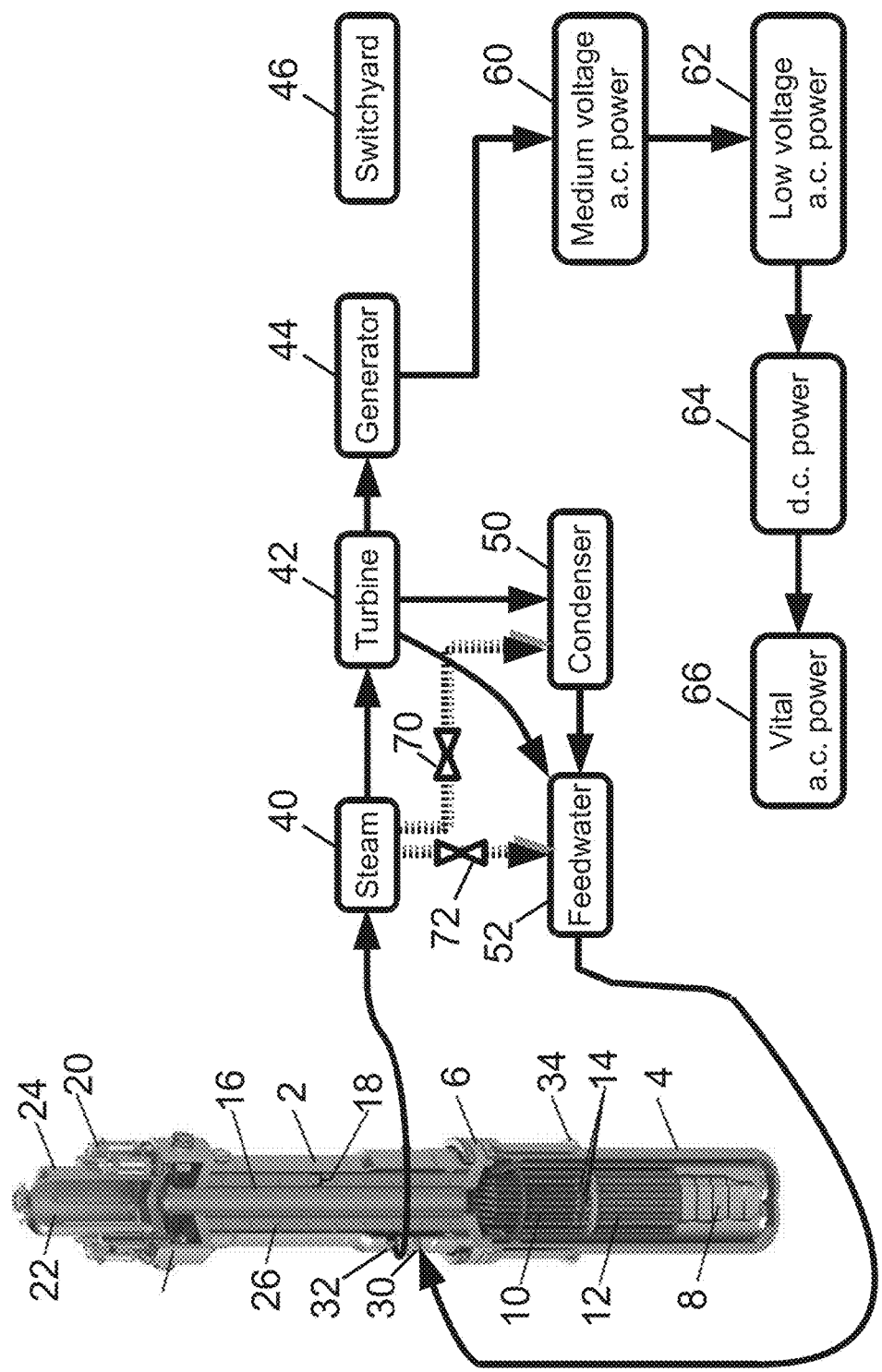
FIG. 3 diagrammatically shows the nuclear power plant of FIGS. 1 and 2 transitioning to an island mode of operation.

With reference to FIG. 3, the nuclear power plant of FIG. 1 is shown, but during transition to the island mode of operation. In the situation depicted in FIG. 3, a station blackout has occurred, and in response a circuit breaker (or plurality of circuit breakers) has severed the electrical connection of the generator 44 to the switchyard 46. To accommodate the transient, a steam bypass valve 70 opens to divert steam flow so as to bypass the turbine 42 and flow directly to the condenser 50. For redundancy, it is contemplated to implement the steam bypass valve 70 as two or more bypass valves in parallel—for example, in one embodiment two 50% bypass valves are employed to implement the steam bypass valve 70.

Optionally, a supplemental steam bypass valve 72 opens concurrently with the opening of the steam bypass valve 70. Opening of the supplemental steam bypass valve 72 sends a portion of the bypass steam flow directly to the feedwater system 52. This portion of the bypass steam flow thus bypasses both the turbine 42 and the condenser 50. The outlet of the steam bypass line controlled by the supplemental bypass valve 72 suitably terminates in a sparger or other component that dissipates the steam into a reservoir of feedwater or into a continuous flow of feedwater, e.g. through a feedwater pipe. In effect, this supplemental bypass steam path controlled by the supplemental bypass valve 72 employs the feedwater as a supplemental condenser, thus reducing the load on the condenser 50.

Figure 4:
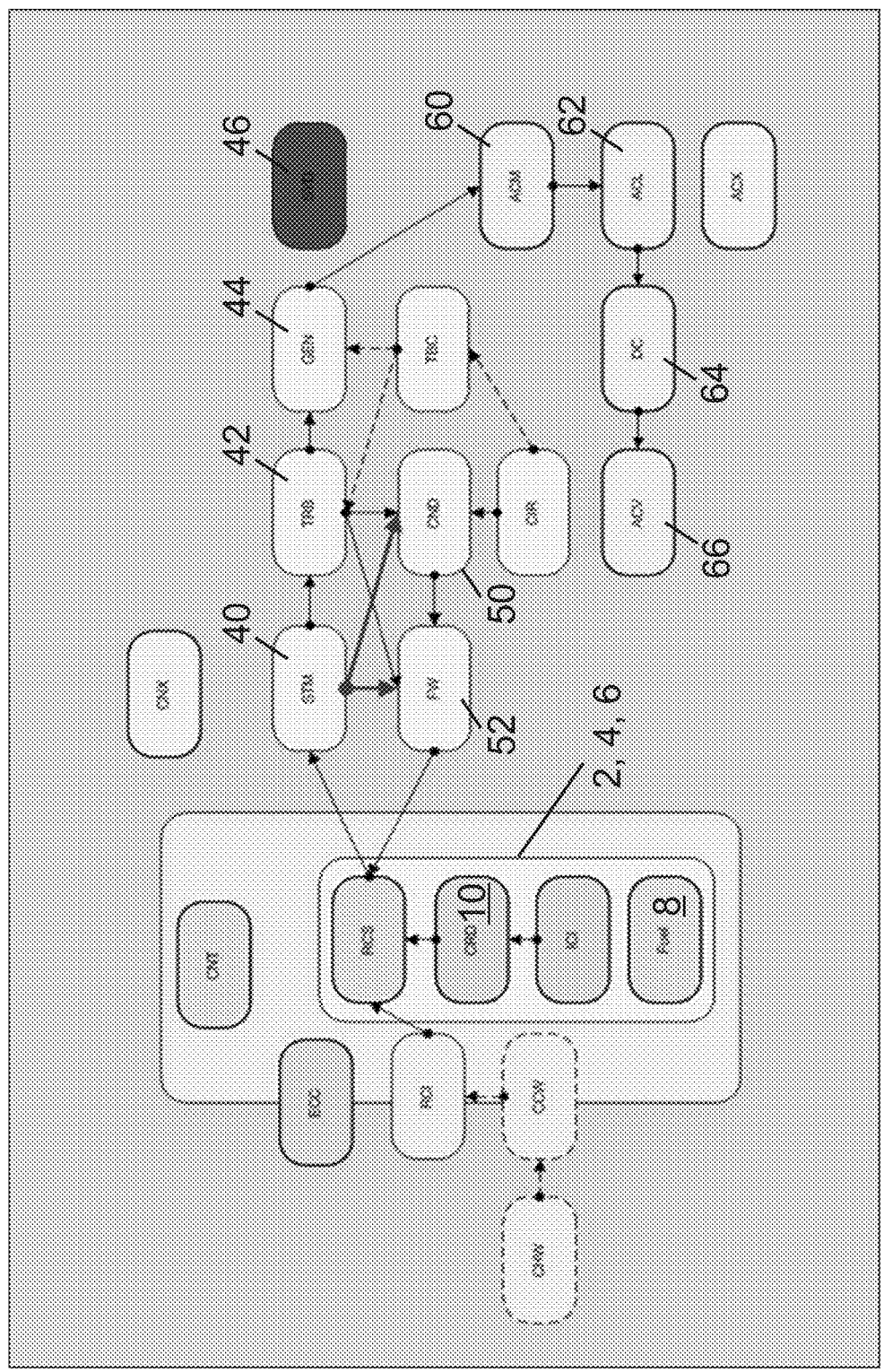
FIG. 4 diagrammatically shows the nuclear power plant in the same transition as shown in FIG. 3, but shown using the alternative diagrammatic representation of FIG. 2.

FIG. 4 shows transition to the island mode of FIG. 3 using the diagrammatic representation of FIG. 2.

Thus, the illustrative nuclear power plant is designed for the ability to operate with the loss of offsite power (i.e., operating in "island mode"). The island mode continues operation and supplies electrical power to the unit auxiliary transformer (e.g., powering the medium voltage a.c. power system 60) while the generator step-up transformer is disconnected from the switchyard 46 from 100 percent power.

Figure 5:
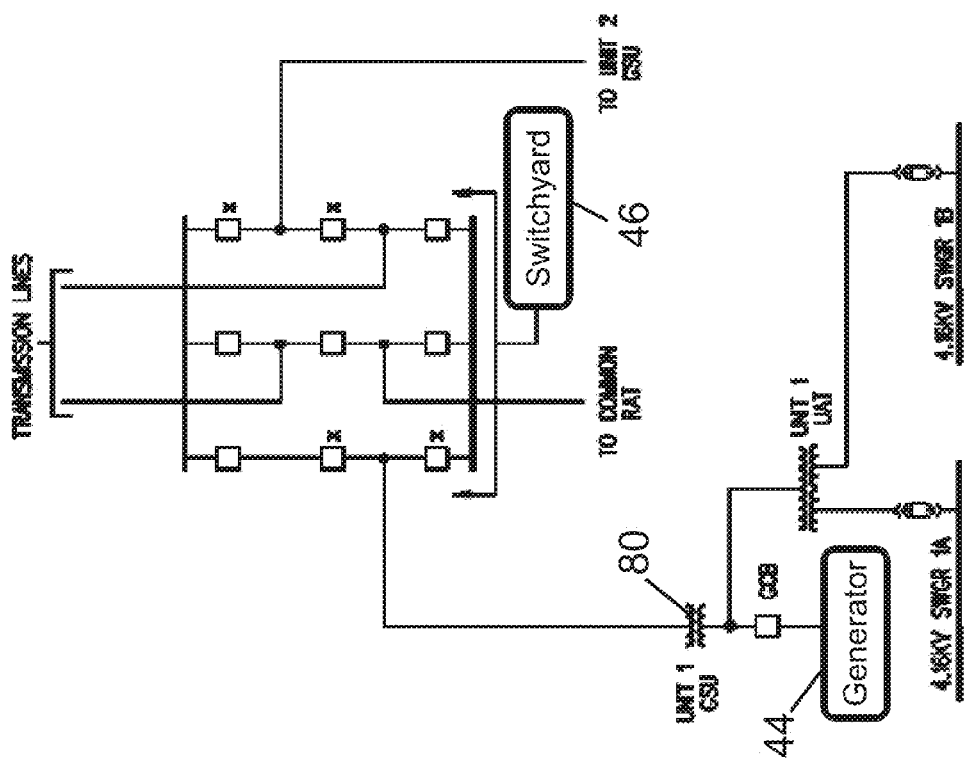
FIG. 5 diagrammatically shows an electrical layout supporting switching to island mode.

With reference to FIG. 5, the electrical layout supporting switching to island mode is diagrammatically shown. In FIG. 5, "UAT" stands for "Unit Auxiliary Transformer", "RAT" stands for "Reserve Auxiliary Transformer", "GSU" stands for "Generator Step-Up transformer", and "SWGR" stands for "switchgear". Also note that the electrical layout shown in FIG. 5 is for a "two-pack" nuclear power plant that includes two nuclear reactor units labeled "UNIT 1" and "UNIT 2" respectively. Only the circuitry for UNIT 1 is depicted in FIG. 5, with a line labeled "TO UNIT 2 GSU" indicating the parallel connection to UNIT 2. A station blackout, as used herein, is to be construed as encompassing a loss of power or other grid disturbance sufficiently severe that it calls for isolating the nuclear power plant from the electrical grid. When a station blackout is detected, breakers labeled with an asterisk ("*") in FIG. 5 trip to disconnect the nuclear reactor from the switchyard 46, and the reactor continues to run independently in island mode. When entering island mode (FIGS. 3 and 4), the nuclear power plant places UNIT 1 transformer 80 on the output from the generator 44 in front of the switchyard 46. (The transition for Unit 2 is analogous). The design has the ability to reject 100% of full grid load without a reactor or turbine trip. As shown in FIGS. 3 and 4, to accommodate the transient the turbine bypass system (e.g. bypass valve 70) is designed to dump sufficient steam to the condenser 50 to allow reactor power ramp-down without approaching steam generator or pressurizer safety valve set-points while the plant is still powering house loads 60, 62, 64, 66.

With reference to FIG. 6, the transition to island mode is diagrammatically depicted by way of plotting predicted turbine-generator power (in gross MWe) and reactor power output (in MW thermal) as a function of time. In the illustrative example of FIG. 5, the nuclear power plant is again assumed to be a "two pack" with each reactor unit being a small modular reactor (SMR) of the integral PWR type. having a nominal operating power output of 530 MW thermal and a nominal turbine-generator output of 180 MWe. FIG. 6 plots data for one reactor unit of the two-pack. The transition to island mode is designed to occur over an 8 minute time period with the reactor unit power output dropping to 20% of the normal nominal output (i.e. to about 100 MW thermal). Also plotted in FIG. 6 is the setting of the steam bypass valve 70, which may optionally be implemented as a plurality of valves in parallel (e.g. two 50% bypass valves in one design) to provide redundancy.

If provided, the operation of the optional supplemental bypass valve 72 which dumps steam into the feedwater system 52 (see FIGS. 3 and 4) parallels the plotted operation of the bypass valve 70. The relative bypass steam flows in the main bypass line controlled by the bypass valve 70 and in the supplemental bypass line controlled by the optional supplemental bypass valve 72 is chosen based on the effective condenser capacity of the feedwater system 52.

As seen in FIG. 6, at the onset of the transition to island mode (time t=0 min in FIG. 6), the bypass valve 70 goes full open so that most or all steam bypasses the turbine 42. Over the next several minutes (e.g., over the next 8 minutes in illustrative FIG. 6), the reactor power is gradually decreased and simultaneously the setting of the bypass valve 70 is gradually transitioned from fully open at t=0 min to fully closed at t=8 min. The gradually reduction of steam output of the nuclear reactor leads to a gradual reduction in the turbine-generator electrical power output, until a minimum reactor load is reached at the end of the transition (e.g., at 8 minutes in the illustrative example of FIG. 6).

Although FIG. 6 show linear transitions over the 8 minute time interval for each of the bypass valve setting, the turbine-generator power, and the reactor thermal power output traces, these characteristics can have other transient shapes, e.g. transitions with some curvature. The setting of the bypass valve 70 is a controlled parameter, and is preferably set to dump sufficient steam to the condenser 50 (and to the feedwater 52 via the supplemental bypass valve 72, if provided) to allow reactor power ramp-down without approaching steam generator or pressurizer safety valve setpoints while the plant is still powering house loads. This can be achieved by feedback control. For example, in one approach the bypass valve setting to keep the steam generator and reactor pressure at least (for example) 10% below their respective setpoints. In this way, the load placed on the condenser 50 during the (illustrative 8 minute) transition to island mode is minimized while still ensuring that the steam generator and reactor do not trip and cause a plant shutdown. The supplemental steam bypass provided by the optional supplemental bypass valve 72 further reduces the load on the condenser 50.

The illustrative embodiments are directed to the illustrative integral PWR in which the steam generator 26 is disposed inside the pressure vessel. However, the disclosed approaches are alternatively suitably employed in conjunction with a PWR having an external steam generator.

The disclosed approaches for switching a PWR to island mode without tripping the reactor advantageously enable a PWR to continue operation during a station blackout. When the blackout is lifted, the PWR can be brought back online by closing the breakers marked by asterisks ("*") in FIG. 5 and ramping the reactor power level back up to its nominal operating level. (The bypass valves 70, 72 are fully closed in the steady-state island mode, that is, after the end of the illustrative 8 minute transition period of illustrative FIG. 6, and so the bypass valves 70, 72 simply remain closed as the reactor is brought back online and ramped back to full power).

The disclosed approaches for operating a PWR in island mode advantageously do not entail venting steam to atmosphere. Such venting to atmosphere is an acceptable operational procedure for a PWR, and does not introduce a radiological release because the steam generated by a PWR is secondary coolant. (In contrast, steam generated by a BWR is primary coolant and contains radiological contaminants, and therefore cannot be vented to atmosphere). However, it is recognized herein that venting the secondary coolant steam generated by a PWR to atmosphere is disadvantageous, at least because venting to atmosphere can trip overpressure alarms or activate other alarm conditions, thus delaying PWR reactor restart. The disadvantages of bypass to the condenser 50 are also remediated as disclosed herein by gradually reducing the bypass valve setting to minimize the time-integrated load placed on the condenser 50, and by optionally sending a portion of the bypass steam flow directly into the feedwater system 52 via the optional supplemental bypass valve 72.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. A method of operating a nuclear power plant that includes a pressurized water reactor (PWR), a steam generator, a turbine, an electric generator, and a condenser, the method comprising:
   operating the PWR to heat primary coolant flowing through a nuclear reactor core comprising fissile material immersed in the primary coolant water;
   operating the steam generator to convert secondary coolant feedwater to steam using primary coolant water heated by the operating PWR;
   operating the turbine by flowing steam from the steam generator through the turbine and then through the condenser;
   driving the electric generator using the turbine to generate electricity;
   conveying the generated electricity to an electrical switchyard; and
   responsive to a station blackout, transitioning the nuclear power plant to an island mode over a transition time interval by transition operations including:
      at the beginning of the transition time interval, disconnecting the electric generator from the electrical switchyard and opening a bypass valve to convey bypass steam flow from the steam generator to the condenser wherein the bypass steam flow does not flow through the turbine;
      after opening the bypass valve, gradually closing the bypass valve over the transition time interval; and
      gradually reducing the thermal power output of the PWR over the transition time interval,
      wherein the transition time interval comprises at least a plurality of minutes.

2. The method of claim 1 further comprising:
   concurrently with conveying the generated electricity to the electrical switchyard, also conveying the generated electricity to an electrical power system of the nuclear power plant; and
   in the transitioning, continuing to convey the generated electricity to the electrical power system of the nuclear power plant after the disconnecting of the electric generator from the electrical switchyard.

3. The method of claim 2 wherein the gradual reducing comprises gradually reducing the thermal power output of the PWR over the transition time interval such that the thermal power output of the operating PWR at the end of the transition time interval is 20% or less of the thermal power output of the operating PWR before the transition time interval.

4. The method of claim 2 wherein the gradual closing of the bypass valve over the transition time interval comprises:
   controlling the bypass valve over the transition time interval to convey bypass steam flow from the steam generator to the condenser that is sufficient to enable said gradual reducing of the thermal power output of the PWR over the transition time interval without approaching steam generator or pressurizer safety valve setpoints and while continuing to convey the generated electricity to the electrical power system of the nuclear power plant after the disconnecting of the electric generator from the electrical switchyard.

5. The method of claim 1 wherein the transition operations further include:
   at the beginning of the transition time interval, opening a supplemental bypass valve to convey supplemental bypass steam flow from the steam generator to a feedwater system of the PWR wherein the supplemental bypass steam flow does not flow through the turbine and does not flow through the condenser.

6. The method of claim 5 wherein the transition operations further include: after opening the supplemental bypass valve, gradually closing the supplemental bypass valve over the transition time interval.

7. The method of claim 1 wherein the transition operations do not include venting the steam from the steam generator to atmosphere.

8. The method of claim 1 wherein the operating of the steam generator includes:
   disposing the steam generator inside a pressure vessel of the PWR; and
   flowing the secondary coolant feedwater into a feedwater inlet of the PWR and through the steam generator where primary coolant water heated by the operating PWR heats the secondary coolant feedwater to convert the secondary coolant feedwater to steam that exits a steam outlet of the PWR.

9. The method of claim 1 wherein the gradual closing of the bypass valve over the transition time interval results in the bypass valve being fully closed at the end of the transition time interval.

10. A method operating in conjunction with a nuclear power plant comprising a pressurized water reactor (PWR) operating to heat primary coolant water, a steam generator using the heated primary coolant water to convert secondary coolant feedwater to steam, a turbine driven by steam from the steam generator and operatively connected with an electric generator, and a condenser connected with the turbine to condense steam after flowing through the turbine, the method comprising:
   transitioning the nuclear power plant to an island mode over a transition time interval by transition operations including:
      responsive to detecting a station blackout, electrically isolating the nuclear power plant and opening a bypass valve to convey bypass steam flow from the steam generator to the condenser without flowing through the turbine;
      after opening the bypass valve, gradually closing the bypass valve over the transition time interval; and
      gradually reducing the thermal power output of the PWR over the transition time interval,
      wherein the transition time interval comprises at least a plurality of minutes.

11. The method of claim 10 wherein the transition operations further include:
   responsive to detecting the station blackout, opening a supplemental bypass valve to convey supplemental bypass steam flow from the steam generator to a feedwater system supplying the secondary coolant feedwater to the steam generator;
   wherein the supplemental bypass steam flow does not flow through the turbine and does not flow through the condenser.

12. The method of claim 10 wherein the transition operations do not include venting steam from the steam generator to atmosphere.

13. The method of claim 10 wherein the transition operations further include conveying electricity generated by the generator to an electrical power system of the nuclear power plant during the transition time interval, the method further comprising:
   after the transition time interval, continuing to convey electricity generated by the generator to an electrical power system of the nuclear power plant.

14. The method of claim 10 wherein the gradual reducing of the thermal power output of the PWR over the transition time interval comprises:
   gradually reducing the thermal power output of the PWR over the transition time interval to a level that is 20% or less of the thermal power output of the PWR prior to detecting the station blackout.

* * * * *